(12) United States Patent
Shimada et al.

(10) Patent No.: US 9,205,850 B2
(45) Date of Patent: Dec. 8, 2015

(54) DISPLACEMENT DETECTING APPARATUS FOR RAILROAD RAILS

(71) Applicant: KAWASAKI JUKOGYO KABUSHIKI KAISHA, Kobe-shi, Hyogo (JP)

(72) Inventors: Tadao Shimada, Akashi (JP); Masayuki Mitsue, Kobe (JP); Masayuki Enomoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/366,514

(22) PCT Filed: Dec. 12, 2012

(86) PCT No.: PCT/JP2012/082224
§ 371 (c)(1),
(2) Date: Jun. 18, 2014

(87) PCT Pub. No.: WO2013/099612
PCT Pub. Date: Jul. 4, 2013

(65) Prior Publication Data
US 2014/0341435 A1 Nov. 20, 2014

(30) Foreign Application Priority Data
Dec. 28, 2011 (JP) ................. 2011-289171

(51) Int. Cl.
*G06K 9/00* (2006.01)
*B61K 9/08* (2006.01)
(Continued)

(52) U.S. Cl.
CPC ............... *B61K 9/08* (2013.01); *G01B 11/002* (2013.01); *G01B 11/14* (2013.01); *G01B 11/24* (2013.01); *G06T 7/0042* (2013.01); *G06T 7/0085* (2013.01); *G06T 2207/30236* (2013.01)

(58) Field of Classification Search
CPC ......... B61K 9/08; G01B 11/14; G06T 7/0042
USPC ............................................ 382/104; 702/34
See application file for complete search history.

(56) References Cited

U.S. PATENT DOCUMENTS 4,181,430 A * 1/1980 Shirota et al. ................ 356/3.06
4,198,164 A * 4/1980 Cantor ......................... 356/623
(Continued)

FOREIGN PATENT DOCUMENTS

EP 0 007 227 A1 1/1980
JP A-55-33691 3/1980
(Continued)

OTHER PUBLICATIONS

Mar. 19, 2013 International Search Report issued in International Application No. PCT/JP2012/082224 (with translation).

*Primary Examiner* — John Strege
(74) *Attorney, Agent, or Firm* — Oliff PLC (57) ABSTRACT

A displacement detecting apparatus is provided with a self-position detector for detecting a position and an orientation of the apparatus relative to a preset reference position and a preset reference orientation. Displacement of a rail at an upper surface reference point and a side surface reference point relative to a preset reference position is calculated from imaged image data of the surfaces of the rail using an optical cutting method, and the calculated displacement of the rail is corrected using data obtained from the self-position detector, thereby compensating for errors caused by differences in position and orientation of the apparatus associated with a vehicle running motion. By doing so, the displacement detecting apparatus is superior in maintenance and unlikely to cause measurement errors.

6 Claims, 9 Drawing Sheets

(51) Int. Cl.
*G01B 11/14* (2006.01)
*G06T 7/00* (2006.01)
*G01B 11/00* (2006.01)
*G01B 11/24* (2006.01)

(56) References Cited

U.S. PATENT DOCUMENTS

| | | | | |
|---|---|---|---|---|
| 4,915,504 A | * | 4/1990 | Thurston | 356/604 |
| 8,942,426 B2 | * | 1/2015 | Bar-Am | 382/104 |
| 2006/0144129 A1 | * | 7/2006 | Farritor et al. | 73/81 |
| 2009/0319197 A1 | * | 12/2009 | Villar et al. | 702/34 |
| 2012/0062731 A1 | * | 3/2012 | Enomoto et al. | 348/140 |
| 2013/0230212 A1 | * | 9/2013 | Landes et al. | 382/104 |

FOREIGN PATENT DOCUMENTS

| | | | |
|---|---|---|---|
| JP | B2-55-12522 | | 4/1980 |
| JP | A-5-288519 | | 11/1993 |
| JP | A-10-62164 | | 3/1998 |
| JP | A-11-142124 | | 5/1999 |
| JP | A-2001-41705 | | 2/2001 |
| JP | A-2001-63570 | | 3/2001 |
| JP | 2001141427 | * | 5/2001 |
| JP | A-2001-317930 | | 11/2001 |
| JP | B2-3411861 | | 6/2003 |
| JP | A-2006-258531 | | 9/2006 |
| WO | WO 2010/151345 A1 | | 12/2010 |

\* cited by examiner

DISPLACEMENT DETECTING APPARATUS FOR RAILROAD RAILS

TECHNICAL FIELD

The present invention relates to an apparatus for detecting displacement of railroad rails so as to calculate irregularities of the rails.

BACKGROUND ART

A railroad track may deform vertically or horizontally under the train loads. Upon reliable detection of such deformation (irregularities), the track must be controlled within predetermined standards for maintenance, thereby maintaining the safety or comfortable ride of the trains.

The irregularities of the railroad rails include horizontal irregularity (alignment irregularity), vertical irregularity (longitudinal level irregularity), irregularity in interval between right and left rails (gauge irregularity), a difference in height of the right and left rails (cross level irregularity), and twisting of a rail track (twist irregularity). In order to calculate such irregularities of the rails, an apparatus for detecting the rail displacement is used that irradiates the rails with spot light when installed on a vehicle traveling along the rails (see, for example, Patent Literature 1).

Figure 10:
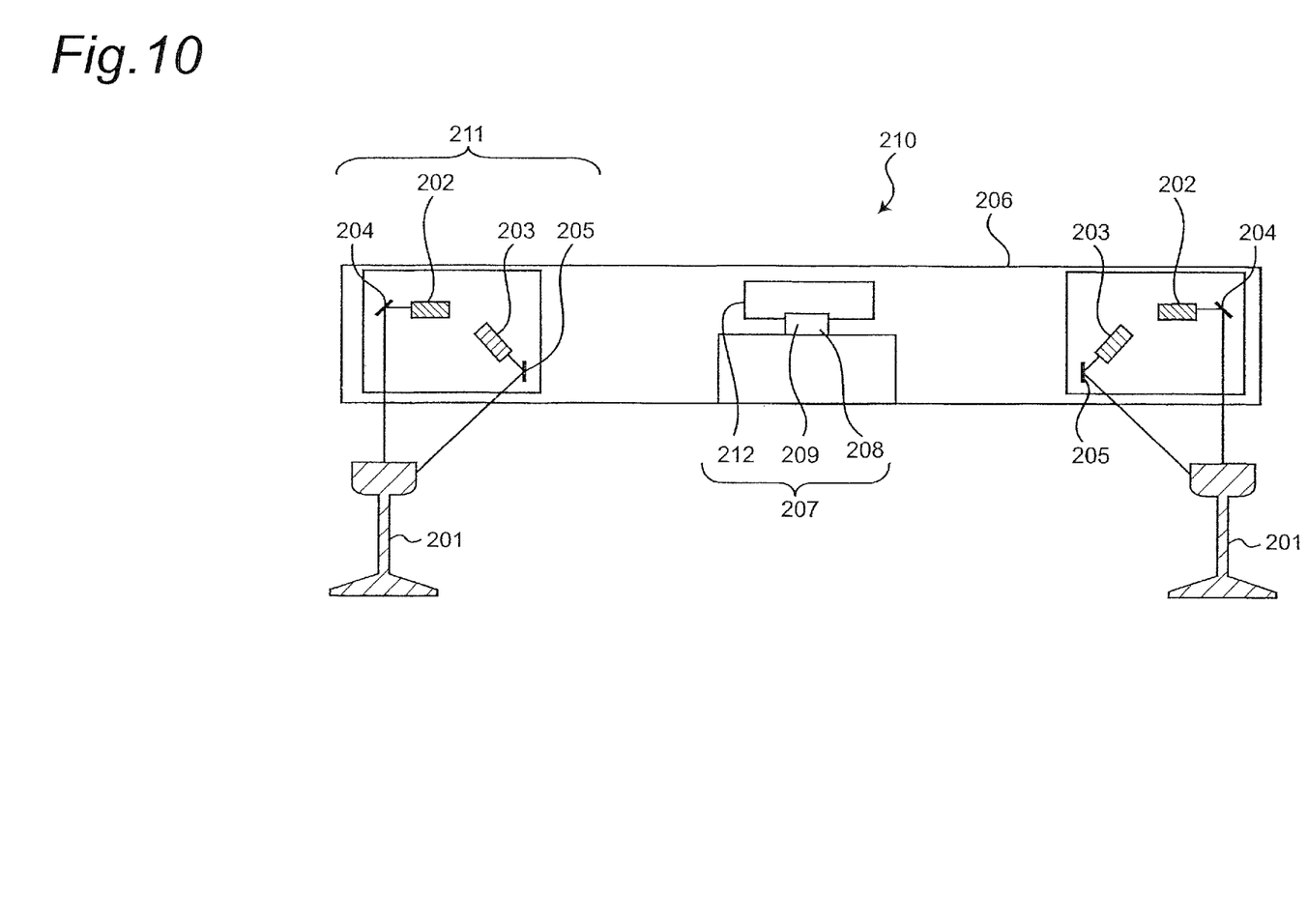
FIG. 10 is a cross-sectional view of a conventional displacement detecting apparatus.

FIG. 10 depicts a displacement detecting apparatus 210 as disclosed in Patent Literature 1, which includes two sets of two displacement detectors 202, 203 for emanating spot light for respective rails 201 to irradiate upper surfaces and inner side surfaces thereof after the spot light has reflected off respective mirrors 204, 205. The displacement of the rails 201 is detected based on the light with which the upper surfaces and the inner side surfaces of the rails 201 have been irradiated using a triangulation method.

Each of the right and left sets of the displacement detectors 202, 203 is fixedly mounted on a housing 206 of the displacement detecting apparatus 210. On the other hand, the angles of inclination of the mirrors 204, 205 for reflecting light can be regulated to measure the same positions on the surfaces of the rails 201. During the measurement, the same points on the surfaces of the rails 201 are continuously irradiated with the light by appropriately controlling the angles of inclination of the mirrors 204, 205. A device for controlling the mirrors 204, 205 in such a way is referred to as a servo mechanism (not shown). In the motion control of the mirrors 204, 205 by the servo mechanism, the angles of the mirrors 205 corresponding to the horizontal displacement detectors 203 are regulated based on positional data of the rails 201 obtained from the vertical displacement detectors 202, and the angles of the mirrors 204 corresponding to the vertical displacement detectors 202 are regulated based on positional data of the rails 201 obtained from the horizontal displacement detectors 203. The displacement detectors 202, 203, the mirrors 204, 205 and the servo mechanism are collectively referred to as a measurement unit 211.

The displacement detecting apparatus 210 is fixed to a railroad vehicle through the housing 206, but because springs are interposed between the vehicle and wheels, a vehicle running motion may cause the housing 206 and the displacement detecting apparatus 210 to have a position difference with respect to the rails 201, thus giving rise to measurement errors. In order to avoid such errors, a self-position detector 207 is installed at the center of the housing 206. The self-position detector 207 is provided with two acceleration meters 208, 209 to measure a rate of acceleration in the vertical direction and that in the horizontal direction. The self-position detector 207 double-integrates the rates of acceleration obtained from the acceleration meters 208, 209 to calculate the displacement of the housing 206 and the self-position detector 207 relative to a preset reference position. The self-position detector 207 is further provided with a gyroscope 212 to measure a horizontal inclination of the housing 206 and the self-position detector 207 relative to a preset reference orientation. Using the displacement and inclination data of the housing 206 and the self-position detector 207 calculated by the self-position detector 207, displacement data of the rails 201 obtained by the displacement detectors 202, 203 are corrected (compensated) for calculation of correct values.

PATENT LITERATURE

Patent Literature 1: JP 2001-63570 A

DISCLOSURE OF THE INVENTION

Problems to be Solved by the Invention

However, the displacement detecting apparatus 210 disclosed in Patent Literature 1 includes movable mirrors 204, 205 and accordingly requires regular maintenance. Also, the displacement detecting apparatus 210 is installed on a vehicle body and, hence, the amount of displacement of the measurement unit 211 with respect to the rails 201 is large and the servo mechanism becomes unable to follow it and is likely to cause measurement errors. For such reasons, stable reliability cannot be obtained.

It is accordingly an objective of the present invention to solve the above-described problems and provide a rail displacement-detecting apparatus that is superior in maintenance and has less incidence of measurement errors.

Means to Solve the Issue

In accomplishing the above objective, the present invention has the following configuration.

The present invention is directed to a displacement detecting apparatus operable to detect the displacement of a rail relative to a preset reference position to calculate irregularities of right and left rails of a railroad. The displacement detecting apparatus includes a self-position detector operable to detect a position and an orientation of the apparatus relative to a preset reference position and a reference orientation; an irradiator operable to irradiate an upper surface and a side surface of the rail with slit light; an image pickup camera operable to image the surfaces of the rail that are irradiated with the slit light by the irradiator; and a controller operable to calculate the displacement of the rail at an upper surface reference point and a side surface reference point relative to the preset reference position from image data of the surfaces of the rail imaged by the image pickup camera using an optical cutting method, and to correct the calculated displacement of the rail using data obtained by the self-position detector, thereby compensating for errors caused by differences in position and orientation of the apparatus associated with a vehicle running motion.

Effects of the Invention

According to the present invention, the displacement of the rail is detected by the utilization of the optical cutting method with the use of slit light with respect to the rail. Accordingly, the reliability and maintenance of the apparatus can be enhanced.

BRIEF DESCRIPTION OF THE DRAWINGS

The above configuration and features of the present invention will become apparent from the following description of preferred embodiments thereof with reference to the accompanying drawings.

DESCRIPTION OF EMBODIMENTS

In a first aspect of the present invention, a displacement detecting apparatus is operable to detect the displacement of a rail relative to a preset reference position to calculate irregularities of right and left rails of a railroad. The displacement detecting apparatus includes a self-position detector operable to detect a position and an orientation of the apparatus relative to a preset reference position and a preset reference orientation, an irradiator operable to irradiate an upper surface and a side surface of the rail with slit light, an image pickup camera operable to image the surfaces of the rail that are irradiated with the slit light by the irradiator, and a controller operable to calculate the displacement of the rail at an upper surface reference point and a side surface reference point relative to the preset reference position from image data of the surfaces of the rail imaged by the image pickup camera using an optical cutting method, and to correct the calculated displacement of the rail using data obtained by the self-position detector, thereby compensating for errors caused by differences in position and orientation of the apparatus associated with a vehicle running motion.

A second aspect of the present invention is directed to the displacement detecting apparatus of the first aspect, wherein the controller determines an outline of the rail based on a cross-sectional shape of the rail detected, calculates an upper surface line and a side surface line of the rail from a plurality of points on the outline of the rail determined, obtains an intersection of the upper surface line and the side surface line calculated, and sets a point on the upper surface line and another point on the side surface line each a predetermined distance away from the obtained intersection as the upper surface reference point and the side surface reference point, respectively, thereby calculating the displacement of the rail relative to the preset reference position.

A third aspect of the present invention is directed to the displacement detecting apparatus of the first or second aspect, wherein the irradiator and the image pickup camera are disposed inwardly of the rail in a horizontal direction, and an inner side surface of the rail is irradiated with the slit light by the irradiator and imaged by the image pickup camera.

A fourth aspect of the present invention is directed to the displacement detecting apparatus of any one of the first to third aspects, wherein wear of the rail is detected using data associated with the cross-sectional shape of the actual rail detected by the controller and data associated with a cross-sectional shape of an original rail inputted to the controller in advance.

A fifth aspect of the present invention is directed to the displacement detecting apparatus of the first or second aspect, wherein the irradiator and the image pickup camera are disposed outwardly of the rail in a horizontal direction, and an outer side surface of the rail is irradiated with the slit light by the irradiator and imaged by the image pickup camera.

Embodiments of the present invention are described hereinafter in detail with reference to the drawings.

(Embodiment 1)

Figure 1:
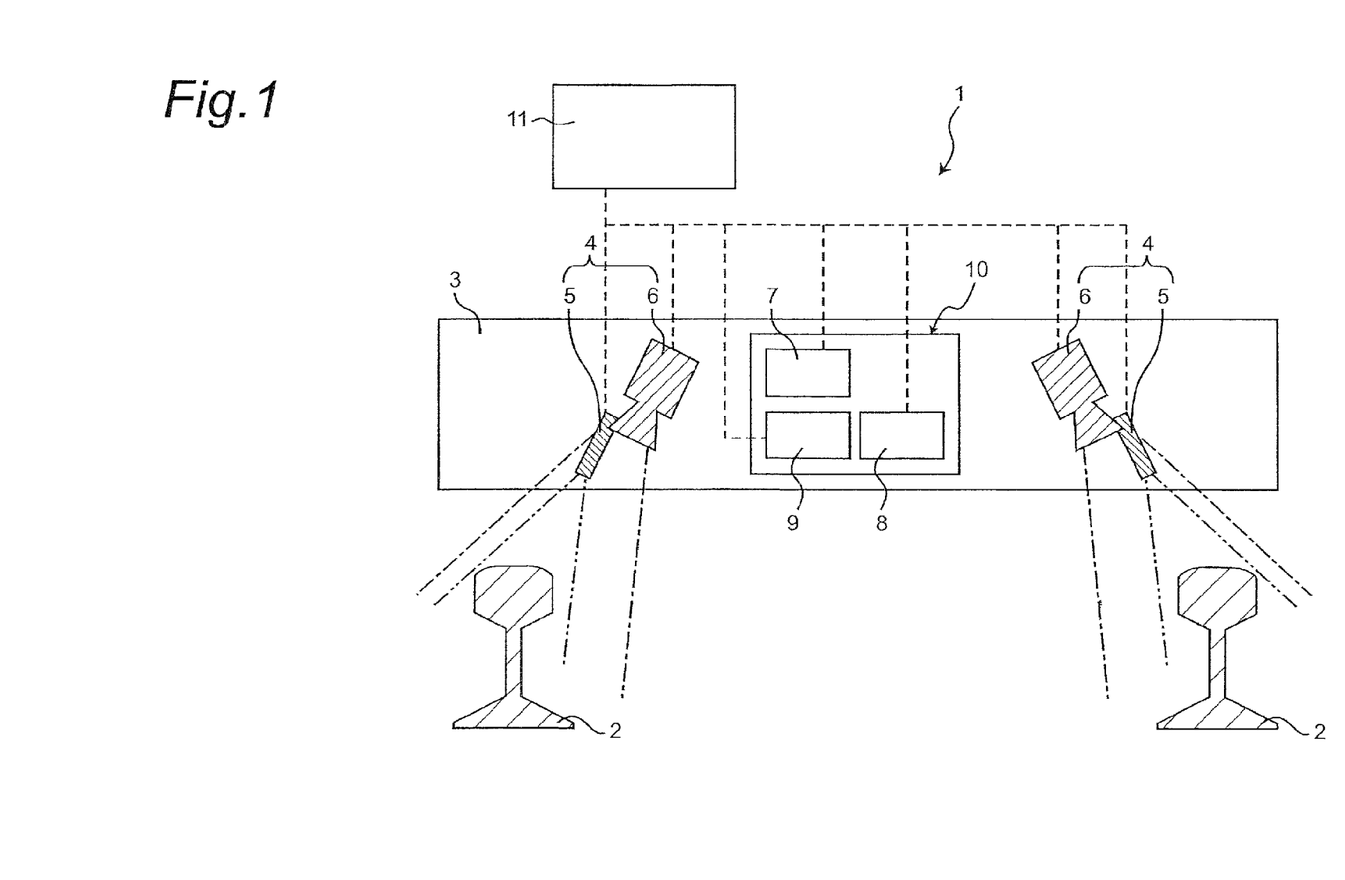
FIG. 1 is a cross-sectional view of a displacement detecting apparatus according to a first embodiment of the present invention.

FIG. 1 depicts a configuration diagram of a rail displacement-detecting apparatus 1 according to a first embodiment of the present invention as viewed in section.

The displacement detecting apparatus 1 is an apparatus for detecting the displacement of rails 2 when installed on a vehicle (not shown) traveling along the rails 2. A chassis of the displacement detecting apparatus 1 is made up of a rigid housing 3 fixed to the vehicle. Various component parts of the displacement detecting apparatus 1 explained later are fixed to the housing 3 and, accordingly, the whole displacement detecting apparatus 1 moves in an integrated fashion with a vehicle running motion. In the first embodiment of the present invention, the housing 3 is used as the chassis of the displacement detecting apparatus 1, but a structure such as frames can be used instead. That is, any rigid body can be used if positional relationships among measuring instruments of the displacement detecting apparatus 1 do not change.

The displacement detecting apparatus 1 is provided with measuring units 4 for detecting the positions of the rails 2. Each measuring unit 4 is provided with an irradiator 5 for irradiating an upper surface and an inner side surface of a head of an associated one of the rails 2 with slit-like light and an image pickup camera 6 for imaging the surfaces of the associated rail 2. The displacement detecting apparatus 1 is provided with two measuring units 4. Two sets of the irradiators 5 and the image pickup cameras 6 are fixed to the housing 3 on the right and left sides thereof, respectively. Also, in order to conduct irradiation of the slit light and image pickup with respect to the upper surfaces and the inner side surfaces of the rails 2, the irradiators 5 and the image pickup cameras 6 are tilted to face outwardly in the horizontal direction. In this first embodiment, one set of measuring unit 4 is provided on each side of the housing 3, but only one set of measuring unit 4 may be provided either on the right side or on the left side to detect the displacement of one of the two rails 2. The term "horizontal direction" as employed throughout this application is defined as a lateral direction with respect to the traveling direction of the vehicle (a direction perpendicular to the traveling direction of the vehicle and parallel to the ground surface).

The displacement detecting apparatus 1 is further provided with a self-position detector 10 for detecting a position difference (position gap) of the displacement detecting apparatus 1 and the housing 3 associated with (due to) the vehicle running motion and a controller 11 for transmitting, for example, signals through the displacement detecting apparatus 1. The self-position detector 10 is provided with a vertical acceleration meter 7 for measuring a rate of acceleration of the displacement detecting apparatus 1 and the housing 3 in the vertical direction, a horizontal acceleration meter 8 for measuring a rate of acceleration of the displacement detecting apparatus 1 and the housing 3 in the horizontal direction, and a gyroscope 9 for measuring a horizontal inclination of the displacement detecting apparatus 1 and the housing 3.

Figure 2:
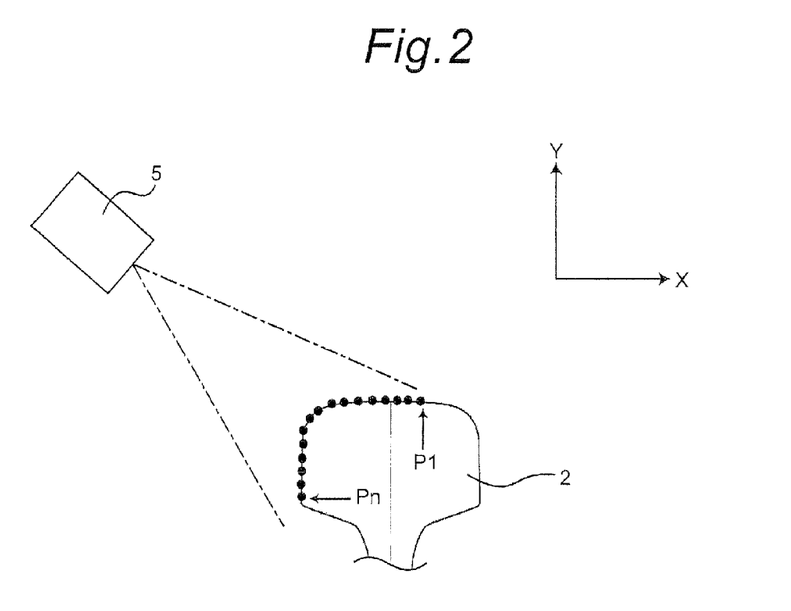
FIG. 2 is a cross-sectional view depicting irradiation of light by an irradiator and a rail head in the first embodiment of the present invention.

FIG. 2 is a cross-sectional view depicting irradiation of the slit light by the irradiator 5 with respect to the right rail 2 and depicting a head of the rail 2 at the time. The horizontal direction and the vertical direction in FIG. 2 are defined as an X-axis and a Y-axis, respectively.

Figure 3:
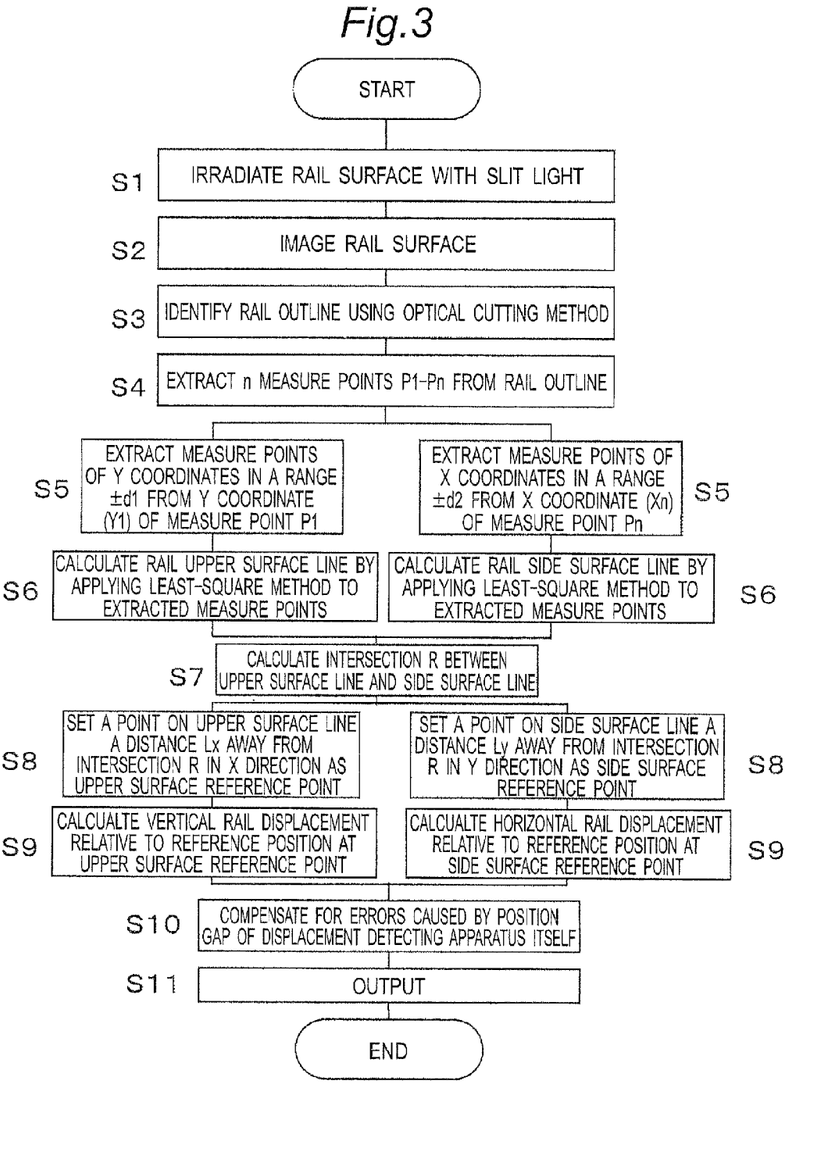
FIG. 3 is a flowchart of a displacement detecting method according to the first embodiment of the present invention.

Procedures for measuring the positions of the right and left rails 2 are explained hereinafter along a flowchart of FIG. 3. A behavior at each step shown in the flowchart of FIG. 3 is executed by a motion control of the component parts and the like of the displacement detecting apparatus 1 by the controller 11. Also, this position measurement is executed when the vehicle is traveling along the right and left rails 2.

Firstly, at step S1 in the flowchart of FIG. 3, the irradiators 5 provided in the measuring units 4 of the displacement detecting apparatus 1 irradiate the upper surfaces and the inner side surfaces of the heads of the right and left rails 2 with slit light.

Secondly, the image pickup cameras 6 take images of the upper surfaces and the inner side surfaces of the rails 2 that have been irradiated with the slit light (step S2). Image data obtained in this way are inputted to the controller 11.

The controller 11 executes processing to identify outlines of the right and left rails 2 using an optical cutting method to the inputted image data (step S3). More specifically, reflected light of the slit light, with which the surfaces of the rails 2 have been irradiated, is observed by the image pickup cameras 6 to seek the surface shapes of the rails 2 by triangulation. Based on this information, the outlines of the upper surfaces and the inner side surfaces of the heads of the right and left rails 2 are identified as two-dimensional coordinate data. The identified data are stored in a storage device such as, for example, a memory in the controller 11 and utilized for subsequent processing by having been read out from the storage device.

Figure 4:
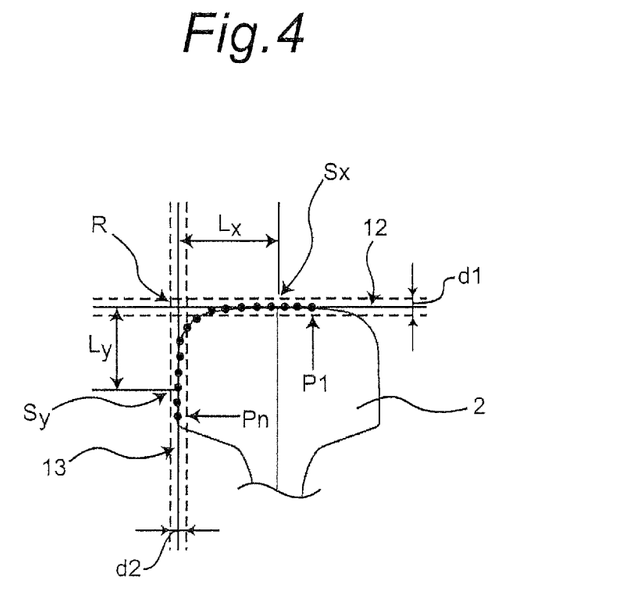
FIG. 4 is a cross-sectional view of the rail head in the first embodiment of the present invention.

Next, as shown in FIG. 4, coordinate data of a plurality of measure points P1 (x1, y1), P2 (x2, y2), ..., Pn (xn, yn) on the outline of each of the rails 2 are extracted (set) using the identified data (step S4). It is preferred that in the extraction of the measure points P1-Pn, all of them be positioned at substantially regular intervals on the outline.

Using those measure points P1-Pn, an upper surface line and a side surface line of the rail 2 are calculated, which can be obtained from the outline of each rail 2. More specifically, a measure point (for example, P1) that is clearly positioned (that must be positioned) on the upper surface of the outline of the rail 2 is selected, and a group of measure points whose Y coordinate are within a predetermined range (for example, ±d1) from a Y coordinate of the selected measure point (P1) is extracted (step S5).

Thereafter, a straight line is calculated with respect to the coordinate data of the extracted group of measure points using the least-square method (step S6). The straight line calculated in this way is a rail upper surface line 12. The rail upper surface line 12 is represented in the X-Y coordinate as shown in the following formula 1.

$$a1x+b1y+c1=0 \quad \text{(Formula 1)}$$

Step 5 and step 6 are similarly executed with respect to the side surface to calculate the side surface line of the rail 2. More specifically, a measure point (for example, Pn) that is clearly positioned (must be positioned) on the side surface of the outline of the rail 2 is selected, and a group of measure points whose X coordinate are within a predetermined range (for example, ±d2) from an X coordinate of the selected measure point (Pn) is extracted (step S5). Thereafter, a straight line is calculated with respect to the coordinate data of the extracted group of measure points using the least-square method (step S6). The straight line calculated in this way is a rail side surface line 13. The rail side surface line 13 is represented in the X-Y coordinate as shown in the following formula 2.

$$a2x+b2y+c2=0 \quad \text{(Formula 2)}$$

Next, coordinate data of an intersection R(Xr, Yr) between the calculated rail upper surface line 12 and the calculated rail side surface line 13 are extracted (step S7).

Then, reference points, where the displacement of the rail 2 on the rail upper surface line 12 and the rail side surface line 13 is to be measured, are calculated. More specifically, a point on the rail upper surface line 12 away from the intersection R by a distance Lx in the X direction is set as an upper surface reference point Sx (step S8).

Thereafter, based on the two-dimensional coordinate data of the outline stored in the controller 11, a Y-direction displacement of the rail 2 at the upper surface reference point Sx relative to a preset reference position is calculated (step S9). The reference position means an arbitrary preset position (set in advance) as a reference to measure the displacement of the rail 2 and may be, for example, a position (point) on an outline of an original rail 2 that has not been displaced nor worn away.

Step S8 and step S9 are similarly executed with respect to the side surface. More specifically, a point on the rail side surface line 13 away from the intersection R by a distance Ly in the Y direction is set as a side surface reference point Sy (step S8). Thereafter, based on the two-dimensional coordinate data of the outline stored in the controller 11, an X-direction displacement of the rail 2 at the side surface reference point Sy relative to a preset reference position is calculated (step S9).

The displacement data of the rail 2 calculated at the above-described step S9 include errors associated with (due to) changes in position and orientation of the displacement detecting apparatus 1 and the housing 3, which may be caused by a vehicle running motion. In order to remove such errors, a compensation(correction) is performed by the self-position detector 10. More specifically, the vertical acceleration meter 7 of the self-position detector 10 measures a vertical rate of acceleration of the displacement detecting apparatus 1 and the housing 3, and the horizontal acceleration meter 8 of the self-position detector 10 measures a horizontal rate of acceleration of the displacement detecting apparatus 1 and the housing 3. The rates of acceleration in those two directions are double-integrated in the controller 11 to calculate data associated with the displacement of the displacement detecting apparatus 1 and the housing 3 relative to the preset reference positions. Further, using the gyroscope 9, data associated with an inclination of the displacement detecting apparatus 1 and the housing 3 in the horizontal direction with respect to the preset reference orientation is calculated.

Based on the displacement data and the horizontal inclination data calculated in this way, the data obtained at step S9 (the Y-direction displacement of the rail 2 at the upper surface reference point Sx relative to the preset reference position and the X-direction displacement of the rail 2 at the side surface reference point Sy relative to the preset reference position) are compensated(corrected), thereby eliminating the errors that may be caused by the position difference of the displacement detecting apparatus 1 itself with respect to the reference positions and the preset reference orientation (step S10).

Finally, the data obtained at step S10 is outputted from the controller 11 to another device (step S11). The another device is a device for calculating irregularities of the rails 2 and evaluates the irregularities of the rails 2 based on the data obtained at step S10 using, for example, the 10-meter-string versed sine method. The irregularities of the rails 2 include horizontal irregularity (alignment irregularity), vertical irregularity (longitudinal level irregularity), irregularity in interval between right and left rails (gauge irregularity), a difference in height of the right and left rails (cross level irregularity), and twisting of a rail track (twist irregularity). The execution of step S11 terminates the flowchart shown in FIG. 3.

In executing the flow shown in FIG. 3, transmission of the signals and the like among the component parts of the displacement detecting apparatus 1 is managed by the controller 11 connected to the component parts of the displacement detecting apparatus 1.

Although in the first embodiment the number of the measure points is set to "n" (n is a positive integer), the number of the measure points may be set to an arbitrary number. High-precision data can be obtained with an increase in "n". On the other hand, the processing load of the controller 11 reduces with a reduction in "n". Accordingly, "n" may be set in view of a desired precision of measurement and a desired processing speed.

As just described, the displacement detecting apparatus 1 according to the present invention can detect the data associated with the displacement of the rails 2 with accuracy to calculate the irregularities of the rails 2. Also, because the errors caused by the position difference of the displacement detecting apparatus 1 are compensated using the self-position detector 10, the data associated with the displacement of the rails 2 can be detected more accurately. In addition, because the displacement detecting apparatus 1 is not provided with any movable members such as mirrors, the load on maintenance reduces. Further, because no servo mechanism is provided, measurement errors are unlikely to occur. Accordingly, stably reliable measured values can be obtained. Also, because of the utilization of the optical cutting method with the use of slit-like light, the outlines of the rails 2 can be detected as continuous points rather than a mere point. Further, it is possible to continue to measure the displacement of the rails 2 at the same position by continuously executing steps S1-S10 of the above-described flow at predetermined time intervals.

(Embodiment 2)

Figure 5:
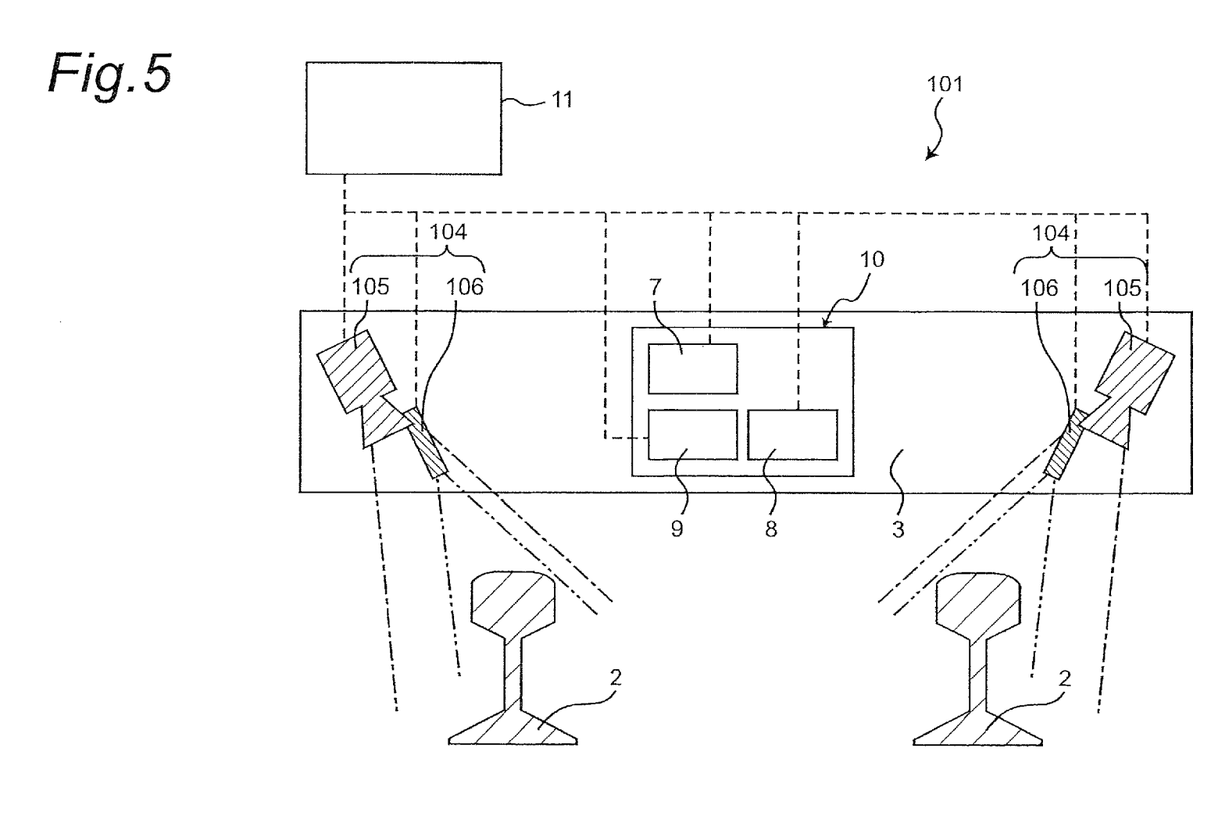
FIG. 5 is a cross-sectional view of a displacement detecting apparatus according to a second embodiment of the present invention.

In the second embodiment of the present invention, the displacement of the rails 2 is detected using a displacement detecting apparatus 101 similar to the first embodiment. Only differences from the first embodiment are explained hereinafter.

FIG. 5 is a configuration diagram of the displacement detecting apparatus 101 according to the second embodiment of the present invention as viewed in section. In the first embodiment, the upper surfaces and the inner side surfaces of the rails 2 are irradiated with slit light, but in the second embodiment, the upper surfaces and outer side surfaces of the rails 2 are irradiated with slit light. Accordingly, as shown in FIG. 5, measuring units 104 are fixed to the housing 3 at locations outwardly of the rails 2, and irradiators 105 and image pickup cameras 106 are disposed so as to face inwardly from above.

The second embodiment differs from the first embodiment only in that the measuring units 104 fixed outwardly of the rails 2 irradiate the upper surfaces and the outer side surfaces of the rails 2 with slit light, and the second embodiment is the same as the first embodiment in configuration, measuring method, and the like other than the above.

The outer side surfaces of the rails 2 have less contact with wheels and, accordingly, hardly wear. For this reason, according to the second embodiment, the displacement of the rails 2 can be detected with little influence of the wear, thus making it possible to calculate more accurate measured values.

(Embodiment 3)

Figure 6:
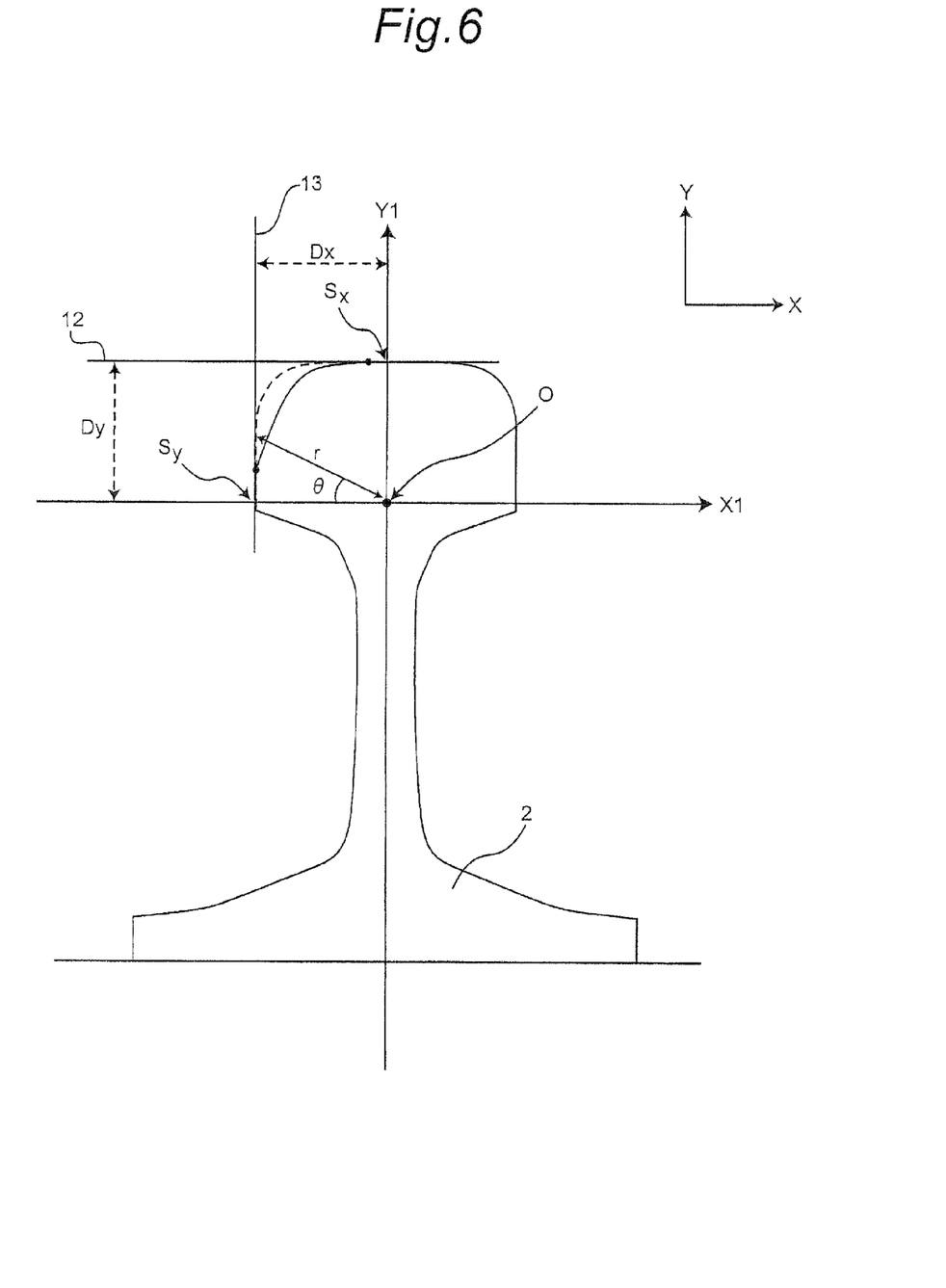
FIG. 6 is a cross-sectional view of a rail head in a third embodiment of the present invention.

FIG. 6 is a cross-sectional view of the right rail 2. As shown in FIG. 6, an upper surface and an inner side surface of the actual rail 2 in contact with a wheel may wear according to the frequency of use. In FIG. 6, a dotted line indicates an original rail 2 and a solid line indicates a worn rail 2. In the third embodiment, the amount of wear of the rail 2 is calculated separately from the vertical displacement and the horizontal displacement of the rail 2 using the displacement detecting apparatus 1 according to the first embodiment. Procedures for calculating the amount of wear of the rail 2 are explained hereinafter along a flowchart of FIG. 7.

Figure 7:
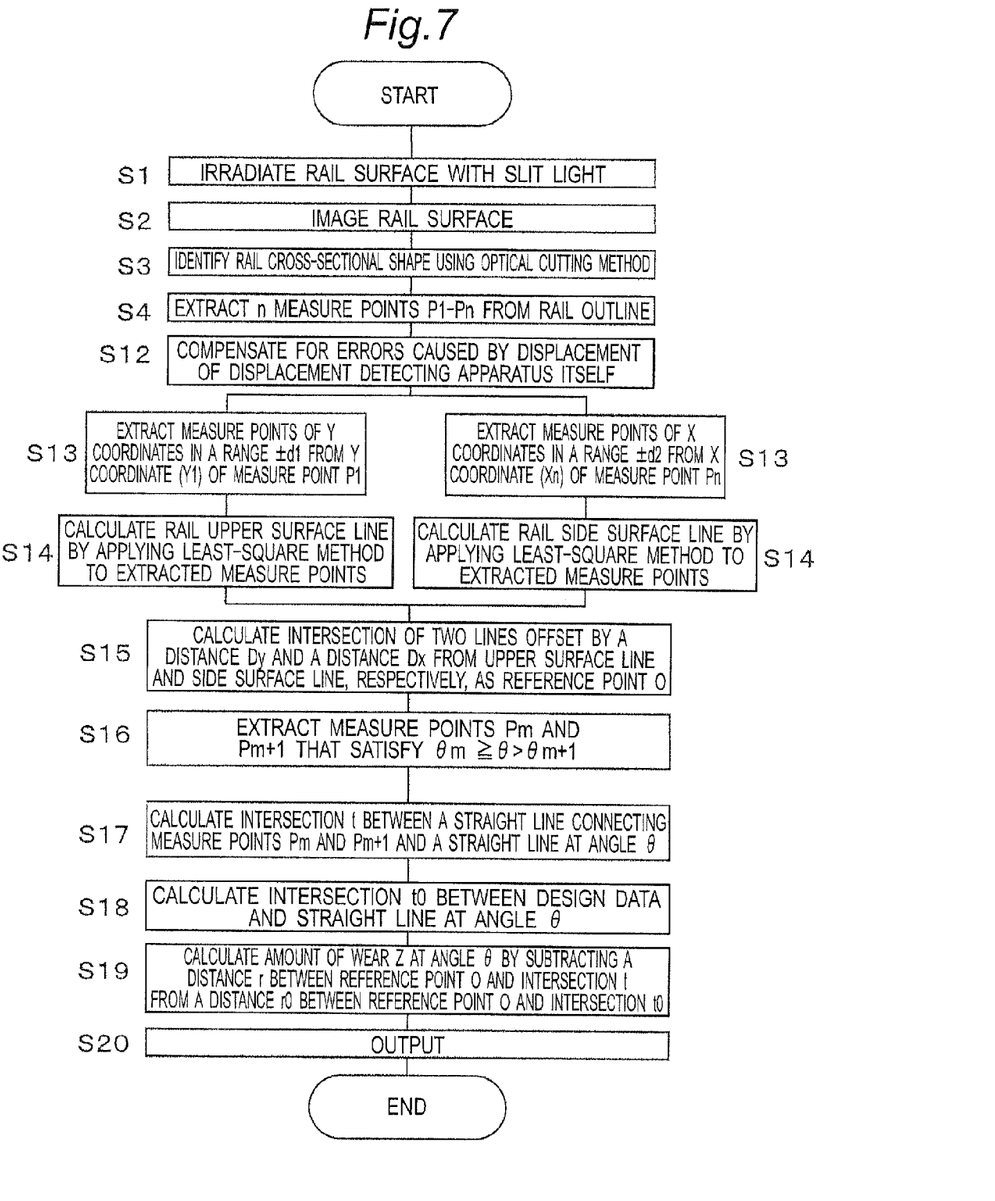
FIG. 7 is a flowchart of a wear calculating method according to the third embodiment of the present invention.

Firstly, as shown in FIG. 7, the procedures from step S1 to step S4 in the third embodiment are the same as those in the first embodiment. That is, n measure points P1-Pn are extracted from the rail outline (step S4). Next, in the third embodiment, errors caused by the displacement of the displacement detecting apparatus 1 itself are compensated, which is executed at step S10 in the first embodiment. More specifically, based on the displacement data and the horizontal inclination data of the displacement detecting apparatus 1 and the housing 3 obtained from the self-position detector 10, the controller 11 corrects the data at the measure points obtained at step S4 to thereby remove (compensate for) the errors caused by the position difference of the displacement detecting apparatus 1 with respect to the preset reference positions and the preset reference orientation (step S12).

Next, the same procedures as those at steps S5 and S6 in the first embodiment are executed. That is, after the measure points have been extracted (step S13), the rail upper surface line 12 and the rail side surface line 13 are calculated as shown in FIG. 6 (step S14). Next, a straight line X1 away from the rail upper surface line 12 by a distance Dy in the Y direction and a straight line Y1 away from the rail side surface line 13 by a distance Dx in the X direction are obtained and an intersection of the two straight lines X1 and Y1 is calculated as a reference point O (step S15). In the third embodiment, Dx and Dy are determined so that the straight line X1 may pass close to lower ends of the side surfaces of the rail 2 and the straight line Y1 may pass close to the center of the upper surface of the rail 2.

Figure 8:
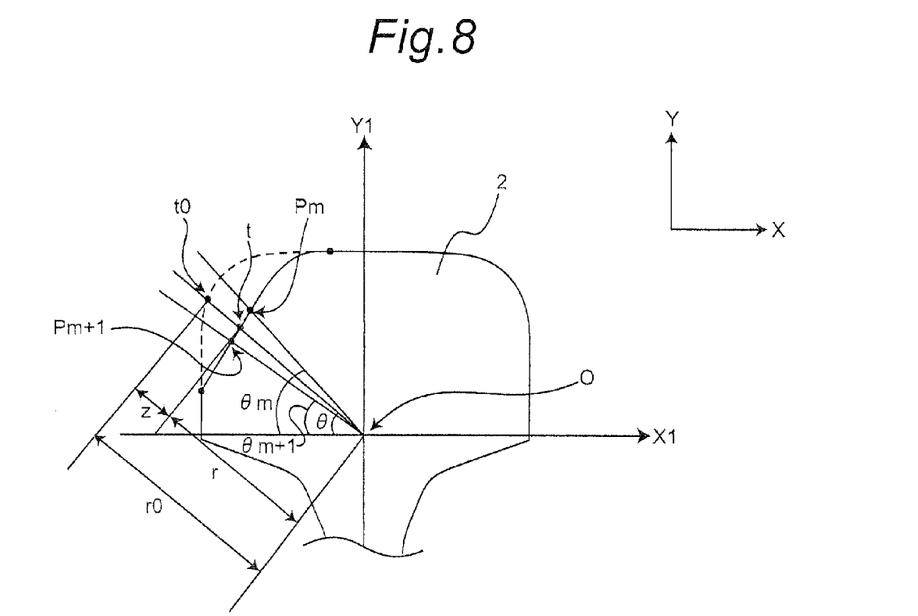
FIG. 8 is a cross-sectional view of the rail head in the third embodiment of the present invention.

FIG. 8 is a cross-sectional view of the right rail 2 focusing on a head thereof. In defining the amount of wear, if the angle at a location where the amount of wear should be obtained is $\theta$ as shown in FIG. 8, a measure point Pm (angle $\theta m$) and a measure point Pm+1 (angle $\theta m+1$) are extracted that satisfy the following formula 3 with respect to the angle $\theta$ (step S16).

$$\theta m \geq \theta > \theta m+1 \quad \text{(Formula 3)}$$

Next, an intersection t between a straight line connecting the measure points Pm and Pm+1 extracted at step S16 and a straight line extending from the reference point O at the angle $\theta$ is calculated (step S17). Further, an intersection t0 between an outline of a rail that has not yet worn and has been stored in the controller 11 (design data) and a straight line extending from the reference point O at the angle θ is calculated (step S18). The intersection t0 can be also obtained before the amount of wear of the rail 2 is measured.

If a distance between the intersection t calculated at step S18 and the reference point O is r and a distance between the intersection t0 and the reference point O is r0, the amount of wear Z to be obtained is calculated by the following formula 4 (step S19).

$$Z=r0-r \quad \text{(Formula 4)}$$

Finally, the data obtained at step S19 is outputted from the controller 11 to another device (step S20).

According to this third embodiment, the amount of wear of the rails 2 can be calculated in addition to the vertical displacement and the horizontal displacement of the rails 2.

Figure 9:
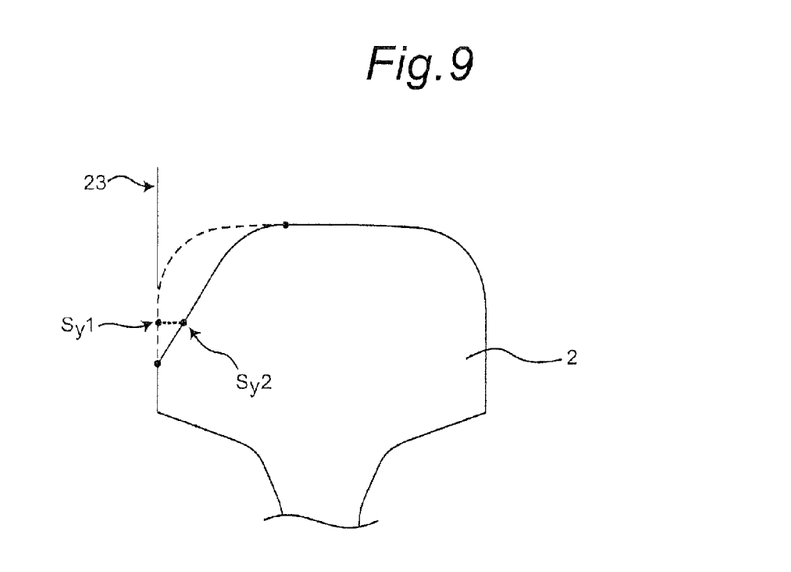
FIG. 9 is another cross-sectional view of the rail head in the third embodiment of the present invention.

Considering that, when the rail 2 has worn as shown in FIG. 9, which points should be employed as the measure points in measuring the displacement of the rail 2, a side surface line 23 including no worn portions can be obtained by sufficiently reducing d2 at step S13 in the embodiment referred to above and, hence, a measure point Sy1 free of the influence of wear can be obtained by setting the Sy1 on the side surface line 23. That is, the displacement measurement of the rails 2 that can mitigate the influence of wear can be performed by directly obtaining the measure point Sy1 without obtain a measure point Sy2 that is influenced by the wear.

The present invention is not limited to the above-described embodiments, but is practicable in various forms. By way of example, the compensation procedure of errors caused by the position difference of the displacement detecting apparatus 1 itself can be performed at an arbitrary step where the errors can be compensated mathematically.

Any combination of the various embodiments referred to above can produce respective effects.

The displacement detecting apparatus according to the present invention is applicable to an apparatus for preparing displacement data of the rails to calculate irregularities of the railroad rails and particularly applicable to an apparatus for detecting the rail displacement by the utilization of the optical cutting method with the use of slit light with respect to the rails.

Although the present invention has been fully described by way of preferred embodiments with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

The contents of a specification, drawings and claims of a Japanese patent application No. 2011-289171 filed Dec. 28, 2011 are herein expressly incorporated by reference in their entirety.

The invention claimed is:

1. A displacement detecting apparatus operable to detect displacement of a rail relative to a preset reference position to calculate irregularities of right and left rails of a railroad, the displacement detecting apparatus comprising:
    a self-position detector operable to detect a position and an orientation of the apparatus relative to a preset reference position and a preset reference orientation;
    an irradiator operable to irradiate an upper surface and a side surface of the rail with slit light;
    an image pickup camera operable to image the surfaces of the rail that are irradiated with the slit light by the irradiator; and
    a controller operable to calculate the displacement of the rail at an upper surface reference point and a side surface reference point relative to the preset reference position from image data of the surfaces of the rail imaged by the image pickup camera using an optical cutting method, and to correct the calculated displacement of the rail using data obtained by the self-position detector, thereby compensating for errors caused by differences in position and orientation of the apparatus associated with a vehicle running motion,
    wherein the controller determines an outline of the rail based on a cross-sectional shape of the rail detected, calculates an upper surface line and a side surface line of the rail from a plurality of points on the outline of the rail determined, obtains an intersection of the upper surface line and the side surface line calculated, and sets a point on the upper surface line and another point on the side surface line each a predetermined distance away from the obtained intersection as the upper surface reference point and the side surface reference point, respectively, thereby calculating the displacement of the rail relative to the preset reference position.

2. The displacement detecting apparatus according to claim 1, wherein the controller calculates the upper surface line and the side surface line of the rail by selecting a measure point that is positioned on the upper surface of the outline of the rail from a plurality of measure points on the outline of the rail and extracting a group of measure points within a predetermined range from the selected measure point for calculating the upper surface line of the rail, and selecting a measure point that is positioned on the side surface of the outline of the rail from the plurality of measure points on the outline of the rail and extracting a group of measure points within a predetermined range from the selected measure point for calculating the side surface line of the rail.

3. The displacement detecting apparatus according to claim 2, the controller calculates the upper surface line and the side surface line of the rail by using the least-square method with respect to coordinate data of the extracted groups of measure points.

4. The displacement detecting apparatus according to claim 1, wherein the irradiator and the image pickup camera are disposed inwardly of the rail in a horizontal direction, and an inner side surface of the rail is irradiated with the slit light by the irradiator and imaged by the image pickup camera.

5. The displacement detecting apparatus according to claim 1, wherein wear of the rail is detected using data associated with the cross-sectional shape of the actual rail detected by the controller and data associated with a cross-sectional shape of an original rail inputted to the controller in advance.

6. The displacement detecting apparatus according to claim 1, wherein the irradiator and the image pickup camera are disposed outwardly of the rail in a horizontal direction, and an outer side surface of the rail is irradiated with the slit light by the irradiator and imaged by the image pickup camera.

* * * * *